(12) United States Patent
Wang et al.

(10) Patent No.: US 12,445,637 B2
(45) Date of Patent: Oct. 14, 2025

(54) SLICE TYPE IN VIDEO CODING

(71) Applicant: Bytedance Inc., Los Angeles, CA (US)

(72) Inventors: Ye-kui Wang, San Diego, CA (US); Li Zhang, San Diego, CA (US)

(73) Assignee: Bytedance Inc., Los Angeles, CA (US)

( * ) Notice: Subject to any disclaimer, the term of this patent is extended or adjusted under 35 U.S.C. 154(b) by 0 days.

(21) Appl. No.: 18/400,588

(22) Filed: Dec. 29, 2023

(65) Prior Publication Data

US 2024/0187627 A1 Jun. 6, 2024

Related U.S. Application Data

(63) Continuation of application No. 17/957,375, filed on Sep. 30, 2022, now Pat. No. 11,902,557, which is a
(Continued)

(51) Int. Cl.
*H04N 19/46* (2014.01)
*H04N 19/172* (2014.01)
(Continued)

(52) U.S. Cl.
CPC .......... *H04N 19/46* (2014.11); *H04N 19/172* (2014.11); *H04N 19/174* (2014.11); *H04N 19/184* (2014.11); *H04N 19/70* (2014.11)

(58) Field of Classification Search
None
See application file for complete search history.

(56) References Cited

U.S. PATENT DOCUMENTS

| | | | |
|---|---|---|---|
| 10,244,249 B2 * | 3/2019 | Ramasubramonian | ........ H04N 19/36 |
| 10,321,155 B2 | 6/2019 | Yoo | |

(Continued)

FOREIGN PATENT DOCUMENTS

| | | |
|---|---|---|
| CN | 103210650 A | 7/2013 |
| CN | 103535035 A | 1/2014 |

(Continued)

OTHER PUBLICATIONS

Document: JVET-Q2001-vE, Bross, B., et al., "Versatile Video Coding (Draft 8)," Joint Video Experts Team (JVET) of ITU-T SG 16 WP 3 and ISO/IEC JTC 1/SC 29/WG 11 17th Meeting: Brussels, BE, Jan. 7-17, 2020, 512 pages.

(Continued)

*Primary Examiner* — Mainul Hasan
(74) *Attorney, Agent, or Firm* — Conley Rose, P.C.

(57) ABSTRACT

Methods and apparatus for video processing are described. The video processing may include video encoding, video decoding or video transcoding. One example video processing method includes performing a conversion between a video including one or more pictures including one or more slices and a coded representation of the video, wherein the coded representation conforms to a format rule that specifies that a condition of a field in the coded representation controls a constraint on a slice type or whether the slice type is included in the coded representation for a video slice, wherein the field includes a general constraint flag, a network abstraction layer unit type or whether the video slice is in a first video picture of an access unit.

18 Claims, 11 Drawing Sheets

Related U.S. Application Data continuation of application No. PCT/US2021/024663, filed on Mar. 29, 2021.

(60) Provisional application No. 63/002,064, filed on Mar. 30, 2020.

(51) Int. Cl.
    *H04N 19/174*    (2014.01)
    *H04N 19/184*    (2014.01)
    *H04N 19/70*    (2014.01)

(56) References Cited

U.S. PATENT DOCUMENTS

| | | | |
|---|---|---|---|
| 10,609,327 B2 * | 3/2020 | Tsukagoshi | H04N 21/4345 |
| 10,979,729 B2 * | 4/2021 | Rusanovskyy | H04N 19/186 |
| 11,128,878 B2 * | 9/2021 | Ramasubramonian | H04N 19/85 |
| 11,394,920 B2 * | 7/2022 | Tsukagoshi | G06T 5/92 |
| 11,582,457 B2 * | 2/2023 | Nam | H04N 19/1883 |
| 11,902,557 B2 * | 2/2024 | Wang | H04N 19/172 |
| 2014/0037206 A1 * | 2/2014 | Newton | H04N 19/597 382/166 |
| 2014/0079138 A1 | 3/2014 | Auyeung | |
| 2014/0198857 A1 | 7/2014 | Deshpande | |
| 2015/0304666 A1 | 10/2015 | Seregin | |
| 2016/0156938 A1 | 6/2016 | Fu et al. | |
| 2016/0295220 A1 * | 10/2016 | Oh | H04N 21/4312 |
| 2017/0085894 A1 * | 3/2017 | Ramasubramonian | H04N 19/36 |
| 2017/0085896 A1 * | 3/2017 | Ramasubramonian | H04N 19/184 |
| 2017/0111643 A1 | 4/2017 | Bugdayci Sansli | |
| 2017/0339418 A1 * | 11/2017 | Ramasubramonian | H04N 19/136 |
| 2018/0152721 A1 * | 5/2018 | Rusanovskyy | H04N 19/46 |
| 2018/0295318 A1 * | 10/2018 | Tsukagoshi | H04N 23/76 |
| 2018/0376221 A1 * | 12/2018 | Tsukagoshi | H04N 21/2362 |
| 2019/0045209 A1 * | 2/2019 | Ramasubramonian | H04N 19/463 |
| 2019/0082186 A1 * | 3/2019 | Van Der Vleuten | H04N 19/182 |
| 2019/0149846 A1 | 5/2019 | Fu | |
| 2019/0191174 A1 * | 6/2019 | Ramasubramonian | H04N 19/132 |
| 2019/0253771 A1 * | 8/2019 | Tsukagoshi | H04N 19/98 |
| 2019/0281253 A1 * | 9/2019 | Tsukagoshi | H04N 5/57 |
| 2019/0297337 A1 * | 9/2019 | Ramasubramonian | H04N 19/85 |
| 2020/0296322 A1 * | 9/2020 | Tsukagoshi | H04L 65/70 |
| 2020/0344473 A1 * | 10/2020 | Seregin | H04N 19/117 |
| 2020/0404215 A1 * | 12/2020 | Tsukagoshi | G06T 5/92 |
| 2021/0051362 A1 * | 2/2021 | Tsukagoshi | H04N 21/4356 |
| 2021/0258598 A1 * | 8/2021 | Hendry | H04N 19/187 |
| 2021/0274204 A1 | 9/2021 | He | |
| 2021/0329273 A1 * | 10/2021 | Rusanovskyy | H04N 19/85 |
| 2022/0295091 A1 | 9/2022 | Chujoh | |
| 2022/0329792 A1 * | 10/2022 | Ouedraogo | H04N 19/46 |
| 2022/0394301 A1 * | 12/2022 | Deshpande | H04N 19/172 |
| 2024/0187627 A1 * | 6/2024 | Wang | H04N 19/184 |

FOREIGN PATENT DOCUMENTS

| | | | |
|---|---|---|---|
| CN | 106165429 A | 11/2016 | |
| CN | 106797467 A | 5/2017 | |
| CN | 108028936 A | 5/2018 | |
| EP | 3354025 A1 | 8/2018 | |
| EP | 3354025 B1 * | 12/2023 | H04N 19/132 |
| GB | 201919033 | 7/2021 | |
| IN | 561652 | 2/2025 | |
| JP | 7648809 B2 | 3/2025 | |
| KR | 102777599 B1 | 3/2025 | |
| KR | 102777600 B1 | 3/2025 | |
| TW | 201729594 A * | 8/2017 | H04N 19/184 |
| WO | 2013128010 A2 | 9/2013 | |
| WO | 2015015058 A1 | 2/2015 | |
| WO | WO-2015195849 A1 * | 12/2015 | H04N 19/124 |
| WO | WO-2017053280 A1 * | 3/2017 | H04N 19/184 |
| WO | 2020215101 A1 | 10/2020 | |
| WO | 2021123326 A1 | 6/2021 | |
| WO | 2021174098 A1 | 9/2021 | |

OTHER PUBLICATIONS

"Series H: Audiovisual and Multimedia Systems Infrastructure of audiovisual services—Coding of moving video High efficiency video coding," ITU-T Recommendation ITU0T H.265 | ISO/IEC 23008-2 (in force edition), 692 pages.

Document: JVET-G1001-v1, Chen, J., et al., "Algorithm Description of Joint Exploration Test Model 7 (JEM 7)," Joint Video Exploration Team (JVET) of ITU-T SG 16 WP 3 and ISO/IEC JTC 1/SC 29/WG 11 7th Meeting: Torino, IT, Jul. 13-21, 2017, 50 pages.

Document: JVET-Q2002-v3, Chen, J., et al., "Algorithm description for Versatile Video Coding and Test Model 8 (VTM) 8)," Joint Video Experts Team (JVET) of ITU-T SG 16 WP 3 and ISO/IEC JTC 1/SC 29/WG 11 17th Meeting: Brussels, BE, Jan. 7-17, 2020, 97 pages.

Bossen, F., Retrieved from the internet: https://vcgit.hhi.fraunhofer.de/jvet/VVCSoftware_VTM.git, VTM software, Dec. 22, 2022, 3 pages.

"Information technology—High efficiency coding and media delivery in heterogeneous environments—Part 2: High Efficiency Video Coding," ISO/IEC JTC 1/SC 29/WG 11 N 17661, Text of DIS ISO/IEC 23008-2:201x (4th ed.), Apr. 20, 2018, 8 pages.

Document: JVET-R0068-v1, Wang, Y.K., et al., "AHG8/AHG9/AHG12: Miscellaneous HLS topics," Joint Video Experts Team (JVET) of ITU-T SG 16 WP 3 and ISO/IEC JTC 1/SC 29/WG 11 18th Meeting: by teleconference, Apr. 15-24, 2020, 10 pages.

Document: JVET-R0262-v2, He, Y., et al., "AHG9: On PPS syntax," Joint Video Experts Team (JVET) of ITU-T SG 16 WP 3 and ISO/IEC JTC 1/SC 29/WG 11 18th Meeting: by teleconference, Apr. 15-24, 2020, 4 pages.

Document: JVET-Q0260, Samuelsson, J., et al., "AHG9: Intended display resolution," Joint Video Experts Team (JVET) of ITU-T SG 16 WP 3 and ISO/IEC JTC 1/SC 29/WG 11 17th Meeting: Brussels, BE, Jan. 7-17, 2020, 5 pages.

Document: JVET-M0451, Boyce, J., "Update to interoperability point syntax," Joint Video Experts Team (JVET) of ITU-T SG 16 WP 3 and ISO/IEC JTC 1/SC 29/WG 11 13th Meeting: Marrakech, MA, Jan. 9-18, 2019, 4 pages.

Document: JVET-L1001-v7, Bross, B., et al., "Versatile Video Coding (Draft 3)," Joint Video Experts Team (JVET) of ITU-T SG 16 WP 3 and ISO/IEC JTC 1/SC 29/WG 11 12th Meeting: Macao, CN, Oct. 3-12, 2018, 224 pages.

Document: JVET-Q2001-vE, Bross, B., et al., "Versatile Video Coding (Draft 8)," Joint Video Experts Team (JVET) of ITU-T SG 16 WP3 and ISO/IEC JTC 1/SC 29/WG 11, JVET-Q2001 (version 15), 17th Meeting: Brussels, BE, Jan. 7-17, 2020, total 512 pages. pp. 47-50,56-57,59-61,120,135,143-144.

Document: JVET-Q0118-v1, Wang, Y.K., "AHG8/AHG9: Scalability HLS cleanups," Joint Video Experts Team (JVET) of ITU-T SG 16 WP 3 and ISO/IEC JTC 1/SC 29/WG 11 17th Meeting: Brussels, BE, Jan. 7-17, 2020, 8 pages.

Document: JVET-Q2001-vE, Bross, B., et al., "Versatile Video Coding (Draft 8)," Joint Video Experts Team (JVET) of ITU-T SG 16 WP3 and ISO/IEC JTC 1/SC 29/WG 11, JVET-Q2001 (version 15), 17th Meeting: Brussels, BE, Jan. 7-17, 2020, total 512 pages. pp. 39-46, 100, 112-113.

Communication From a Related Counterpart Application, PCT Application No. PCT/US2021/024663, International Search Report dated Jun. 23, 2021, 9 pages.

Communication From a Related Counterpart Application, PCT Application No. PCT/US2021/024672, International Search Report dated Aug. 18, 2021, 18 pages.

(56) References Cited

OTHER PUBLICATIONS

Communication From a Related Counterpart Application, PCT Application No. PCT/US2021/024675, International Search Report dated Jun. 9, 2021, 9 pages.
Non-Final Office Action dated Jan. 18, 2023, 19 pages, U.S. Appl. No. 17/957,387, filed Sep. 30, 2022.
Foreign Communication From a Counterpart Application, European Application No. 21779320.7, Extended European Search Report dated May 26, 2023, 11 pages.
Foreign Communication From a Counterpart Application, European Application No. 21780523.3, Extended European Search Report dated Apr. 24, 2023, 16 pages.
Non-Final Office Action dated Jun. 5, 2023, 20 pages, U.S. Appl. No. 17/957,375, filed Sep. 30, 2022.
Non-Final Office Action dated Feb. 6, 2023, 25 pages, U.S. Appl. No. 17/957,375, filed Sep. 30, 2022.
Notice of Allowance dated Oct. 5, 2023, 15 pages, U.S. Appl. No. 17/957,375, filed Sep. 30, 2022.
Notification to Grant Patent Right for Invention for Chinese Application No. 202180026561.7, mailed Mar. 3, 2025, 8 pages.
Notification to Grant Patent Right for Invention for Chinese Application No. 202180026946.3, mailed Mar. 20, 2025, 8 pages.
First Office Action for Chinese Application No. 202180025544.1, mailed on Jan. 13, 2025, 12 pages.

* cited by examiner

SLICE TYPE IN VIDEO CODING

CROSS-REFERENCE TO RELATED APPLICATIONS

This application is a continuation of U.S. application Ser. No. 17/957,375, filed on Sep. 30, 2022, which is a continuation of International Patent Application No. PCT/US2021/024663, filed on Mar. 29, 2021, which claims the priority to and benefits of U.S. Provisional Patent Application No. 63/002,064, filed on Mar. 30, 2020. All the aforementioned patent applications are hereby incorporated by reference in their entireties.

TECHNICAL FIELD

The present disclosure relates to image and video processing.

BACKGROUND

Digital video accounts for the largest bandwidth use on the internet and other digital communication networks. As the number of connected user devices capable of receiving and displaying video increases, it is expected that the bandwidth demand for digital video usage will continue to grow.

SUMMARY

The present disclosure discloses embodiments that can be used by video encoders and decoders for processing coded representation of video using control information useful for decoding of the coded representation.

In one example aspect, a video processing method is disclosed. The method includes performing a conversion between a video comprising one or more pictures comprising one or more slices and a bitstream of the video, wherein the bitstream conforms to a format rule; wherein the format rule specifies whether or how a slice type of a slice of the one or more slices is indicated in the bitstream depends on a condition, wherein the condition is based on a general constraint flag, a network abstraction layer unit type or whether the slice is in a first picture of an access unit.

In another example aspect, a video processing method is disclosed. The method includes performing a conversion between a video comprising a picture comprising multiple slices and a bitstream of the video, wherein the bitstream conforms to a format rule that specifies that a flag in a picture header controls applicability of adaptive loop filtering of all slices in the picture.

In another example aspect, a video processing method is disclosed. The method includes performing a conversion between a video comprising one or more pictures comprising one or more slices and a bitstream of the video according to a format rule, wherein a format rule specifies a repetition time for a parameter set associated with the video.

In another example aspect, a video processing method is disclosed. The method includes performing a conversion between a video comprising a picture in a video unit and a bitstream of the video according to a format rule, wherein the format rule specifies that, responsive to a width of a picture being equal to a maximum allowed picture width in the video unit and a height of the picture being equal to a maximum allowed picture height in the video unit, a conformance window flag in a picture parameter set corresponding to the picture is set to a zero value.

In another example aspect, a video processing method is disclosed. The method includes performing a conversion between a video comprising one or more pictures comprising one or more slices and a coded representation of the video, wherein the coded representation conforms to a format rule that specifies that a condition of a field in the coded representation controls a constraint on a slice type or whether the slice type is included in the coded representation for a video slice, wherein the field comprises a general constraint flag, a network abstraction layer unit type or whether the video slice is in a first video picture of an access unit.

In another example aspect, another video processing method is disclosed. The method includes: performing a conversion between a video comprising one or more pictures comprising one or more slices and a coded representation of the video, wherein the coded representation conforms to a format rule that specifies to disable adaptive loop filtering of all slices in a video picture based on a value of a flag in a picture header of the video picture.

In another example aspect, another video processing method is disclosed. The method includes performing a conversion between a video comprising one or more pictures comprising one or more slices and a coded representation of the video, wherein the coded representation conforms to a format rule that specifies that a conformance window flag is set to a disable mode in case that a height and a width of a current picture are equal to a maximum height and a maximum width in the video.

In another example aspect, another video processing method is disclosed. The method includes performing a conversion between a video comprising one or more pictures comprising one or more slices and a coded representation of the video, wherein the coded representation conforms to a format rule that specifies a repetition time for a parameter set.

In yet another example aspect, a video encoder apparatus is disclosed. The video encoder comprises a processor configured to implement above-described methods.

In yet another example aspect, a video decoder apparatus is disclosed. The video decoder comprises a processor configured to implement above-described methods.

In yet another example aspect, a computer readable medium having code stored thereon is disclosed. The code embodies one of the methods described herein in the form of processor-executable code.

These, and other, features are described throughout the present disclosure.

DETAILED DESCRIPTION

Figure 1:
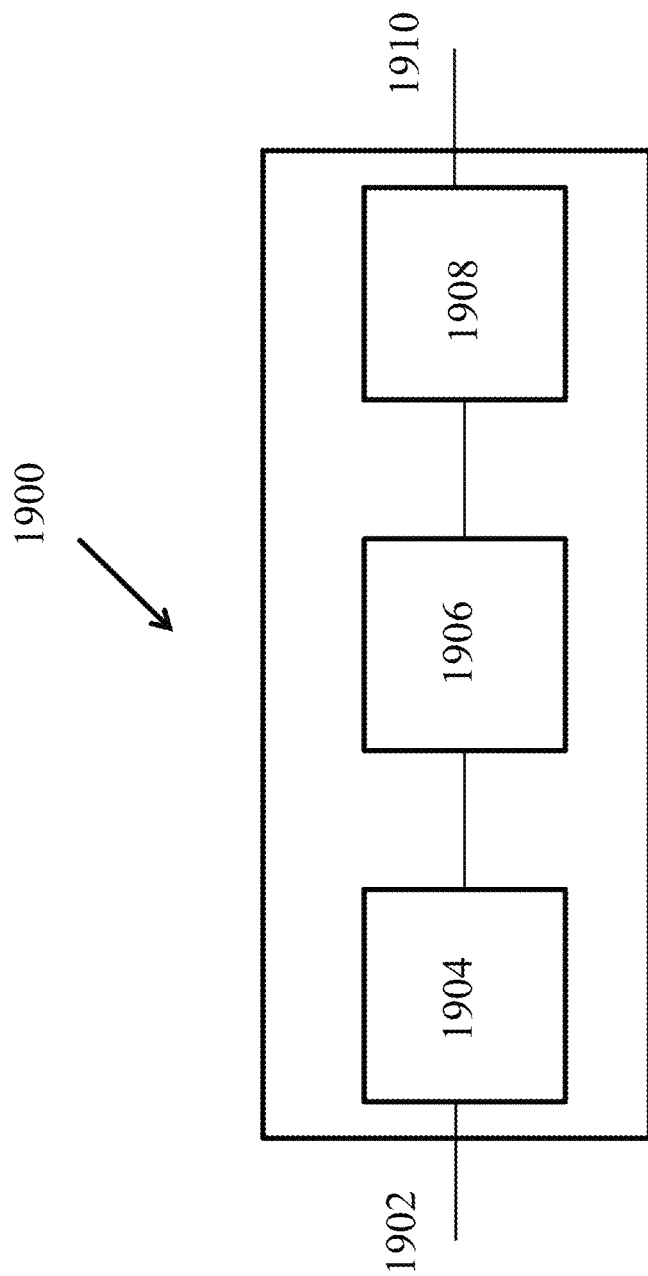
FIG. 1 is a block diagram of an example video processing system.

Section headings are used in the present disclosure for ease of understanding and do not limit the applicability of techniques and embodiments disclosed in each section only to that section. Furthermore, H.266 terminology is used in some description only for ease of understanding and not for limiting scope of the disclosed embodiments. As such, the techniques described herein are applicable to other video codec protocols and designs also.

The following acronyms may be referred to at various points throughout this disclosure.

1. ABBREVIATIONS

ALF Adaptive Loop Filter
APS Adaptation Parameter Set
AU Access Unit
AUD Access Unit Delimiter
AVC Advanced Video Coding
CLVS Coded Layer Video Sequence
CPB Coded Picture Buffer
CRA Clean Random Access
CTU Coding Tree Unit
CVS Coded Video Sequence
DCI Decoding Capability Information
DPB Decoded Picture Buffer
DU Decoding Unit
EOB End Of Bitstream
EOS End Of Sequence
GDR Gradual Decoding Refresh
HEVC High Efficiency Video Coding
HRD Hypothetical Reference Decoder
IDR Instantaneous Decoding Refresh
IRAP Intra Random Access Pictures
JEM Joint Exploration Model
LMCS Luma Mapping with Chroma Scaling
MCTS Motion-Constrained Tile Sets
NAL Network Abstraction Layer
OLS Output Layer Set
PH Picture Header
PPS Picture Parameter Set
PTL Profile, Tier and Level
PU Picture Unit
RADL Random Access Decodable Leading (Picture)
RAP Random Access Point
RASL Random Access Skipped Leading (Picture)
RBSP Raw Byte Sequence Payload
RPL Reference Picture List
RPS Reference Picture Set
SAO Sample Adaptive Offset
SEI Supplemental Enhancement Information
SPS Sequence Parameter Set
STSA Step-wise Temporal Sublayer Access
SVC Scalable Video Coding
VCL Video Coding Layer
VPS Video Parameter Set
VTM VVC Test Model
VUI Video Usability Information
VVC Versatile Video Coding

2. INTRODUCTION

This disclosure is related to video coding technologies. Specifically, it is about improvements on signalling of slice type, ALF, and conformance window, as well as on repetition of some non-VCL NAL units, including VPS, SPS, PPS, APS, and DCI NAL units. The ideas may be applied individually or in various combination, to any video coding standard or non-standard video codec that supports multi-layer video coding, e.g., the being-developed Versatile Video Coding (VVC).

3. INITIAL DISCUSSION

Video coding standards have evolved primarily through the development of the well-known International Telecommunication Union (ITU) Telecommunication Standardization Sector (ITU-T) and International Organization for Standardization (ISO)/International Electrotechnical Commission (IEC) standards. The ITU-T produced H.261 and H.263, ISO/IEC produced Moving Picture Experts Group (MPEG)-1 and MPEG-4 Visual, and the two organizations jointly produced the H.262/MPEG-2 Video and H.264/MPEG-4 Advanced Video Coding (AVC) and H.265/HEVC [1] standards. Since H.262, the video coding standards are based on the hybrid video coding structure wherein temporal prediction plus transform coding are utilized. To explore the future video coding technologies beyond HEVC, the Joint Video Exploration Team (JVET) was founded by Video Coding Experts Group (VCEG) and MPEG jointly in 2015. Since then, many new methods have been adopted by JVET and put into the reference software named Joint Exploration Model (JEM) [2]. The JVET meeting is concurrently held once every quarter, and the new coding standard is targeting a 50% bitrate reduction as compared to HEVC. The new video coding standard was officially named as Versatile Video Coding (VVC) in the April 2018 JVET meeting, and the first version of VVC test model (VTM) was released at that time. As there are continuous efforts contributing to VVC standardization, new coding techniques are being adopted to the VVC standard in every JVET meeting. The VVC working draft and test model VTM are then updated after every meeting. The VVC project is now aiming for technical completion (FDIS) at the July 2020 meeting.

3.1 Parameter Sets

AVC, HEVC, and VVC specify parameter sets. The types of parameter sets include SPS, PPS, APS, and VPS. SPS and PPS are supported in all of AVC, HEVC, and VVC. VPS was introduced since HEVC and is included in both HEVC and VVC. APS was not included in AVC or HEVC but is included in the latest VVC draft text.

SPS was designed to carry sequence-level header information, and PPS was designed to carry infrequently changing picture-level header information. With SPS and PPS, infrequently changing information need not to be repeated for each sequence or picture, hence redundant signalling of this information can be avoided. Furthermore, the use of SPS and PPS enables out-of-band transmission of the important header information, thus not only avoiding the need for redundant transmissions but also improving error resilience.

VPS was introduced for carrying sequence-level header information that is common for all layers in multi-layer bitstreams.

APS was introduced for carrying such picture-level or slice-level information that needs quite some bits to code, can be shared by multiple pictures, and in a sequence, there can be quite many different variations.

3.2 Slice Header and Picture Header in VVC

Similar to HEVC, the slice header in VVC conveys information for a particular slice. This includes slice address, slice type, slice quantization parameter (QP), picture order count (POC) least significant bits (LSBs), RPS and RPL information, weighted prediction parameters, loop filtering parameters, entry offsets of tiles and wavefront parallel processing (WPP), etc.

VVC introduced the picture header (PH), which contains header parameters for a particular picture. Each picture must have one or only one PH. The PH basically carries those parameters that would have been in the slice header if PH were not introduced but each has the same value for all slices of a picture. These include IRAP/GDR picture indications, inter/intra slices allowed flags, POC LSB and optionally POC most significant bit(s) (MSB), information on RPLs, deblocking, SAO, ALF, QP delta, and weighted prediction, coding block partitioning information, virtual boundaries, co-located picture information, etc. It often occurs that each picture in an entire sequence of pictures contains only one slice. To allow not to have at least two NAL units for each picture in such cases, the PH syntax structure is allowed to be included either in the PH NAL unit or in the slice header.

In VVC, information on the collocated picture, which is used for temporal motion vector prediction, is signalled either in the picture header or in the slice header.

3.3 Picture Resolution Change Within a Sequence

In AVC and HEVC, the spatial resolution of pictures cannot change unless a new sequence using a new SPS starts, with an TRAP picture. VVC enables picture resolution change within a sequence at a position without encoding an TRAP picture, which is always intra-coded. This feature is sometimes referred to as reference picture resampling (RPR), as the feature needs resampling of a reference picture used for inter prediction when that reference picture has a different resolution than the current picture being decoded.

The scaling ratio is restricted to be greater than or equal to ½ (2 times downsampling from the reference picture to the current picture), and less than or equal to 8 (8 times upsampling). Three sets of resampling filters with different frequency cutoffs are specified to handle various scaling ratios between a reference picture and the current picture. The three sets of resampling filters are applied respectively for the scaling ratio ranging from ½ to 1/1.75, from 1/1.75 to 1/1.25, and from 1/1.25 to 8. Each set of resampling filters has 16 phases for luma and 32 phases for chroma which is the same as the case of motion compensation interpolation filters. Actually, the normal MC interpolation process is a special case of the resampling process with scaling ratio ranging from 1/1.25 to 8. The horizontal and vertical scaling ratios are derived based on picture width and height, and the left, right, top, and bottom scaling offsets specified for the reference picture and the current picture.

Other aspects of the VVC design for support of this feature that are different from HEVC include: i) The picture resolution and the corresponding conformance window are signalled in the PPS instead of in the SPS, while in the SPS the maximum picture resolution is signalled. ii) For a single-layer bitstream, each picture store (a slot in the DPB for storage of one decoded picture) occupies the buffer size as required for storing a decoded picture having the maximum picture resolution.

3.4 Adaptive Loop Filter (ALF)

Figure 7:
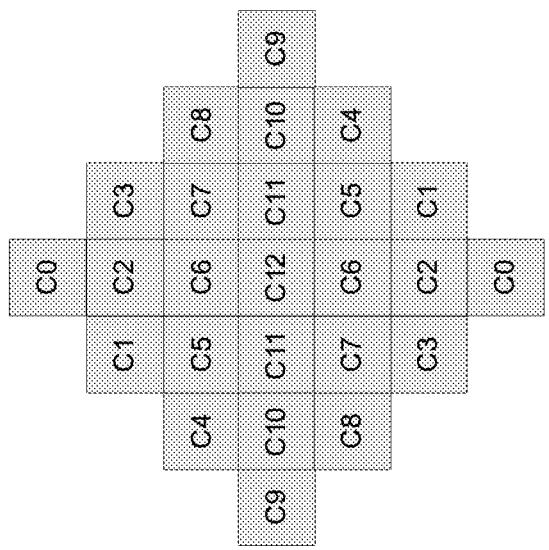
FIG. 7 shows examples of adaptive loop filter (ALF) filter shapes (chroma: 5×5 diamond, luma: 7×7 diamond).
Figure 7:
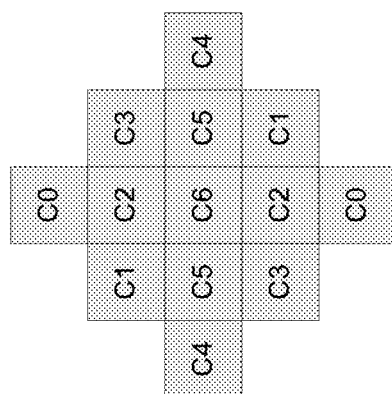

Two diamond filter shapes (as shown in FIG. 7) are used in block-based ALF. The 7×7 diamond shape is applied for luma component and the 5×5 diamond shape is applied for chroma components. One among up to 25 filters is selected for each 4×4 block, based on the direction and activity of local gradients. Each 4×4 block in the picture is classified based on directionality and activity. Before filtering each 4×4 block, simple geometric transformations such as rotation or diagonal and vertical flip can be applied to the filter coefficients depending on gradient values calculated for that block. This is equivalent to applying these transformations to the samples in the filter support region. The idea is to make different blocks to which ALF is applied more similar by aligning their directionality. Block-based classification is not applied to the chroma components.

ALF filter parameters are signalled in the adaptation parameter set (APS). In one APS, up to 25 sets of luma filter coefficients and clipping value indices, and up to eight sets of chroma filter coefficients and clipping value indices, could be signalled. To reduce bits overhead, filter coefficients of different classification for luma component can be merged. In the picture or slice header, the IDs of up to 7 APSs can be signalled to specify the luma filter sets that are used for the current picture or slice. The filtering process is further controlled at coding tree block (CTB) level. A luma CTB can choose a filter set among 16 fixed filter sets and the filter sets signalled in APSs. For the chroma components, an APS ID is signalled in picture or slice header to indicate the chroma filter sets being used for the current picture or slice. At CTB level, a filter index is signalled for each chroma CTB if there is more than one chroma filter set in the APS. When ALF is enabled for a CTB, for each sample within the CTB, the diamond shape filter with the signalled weights is performed, with a clipping operation applied to clip the difference between the neighbor sample and the current sample. The clipping operation introduces non-linearity to make ALF more efficient by reducing the impact of neighbor sample values that are too different with the current sample value.

Figure 8:
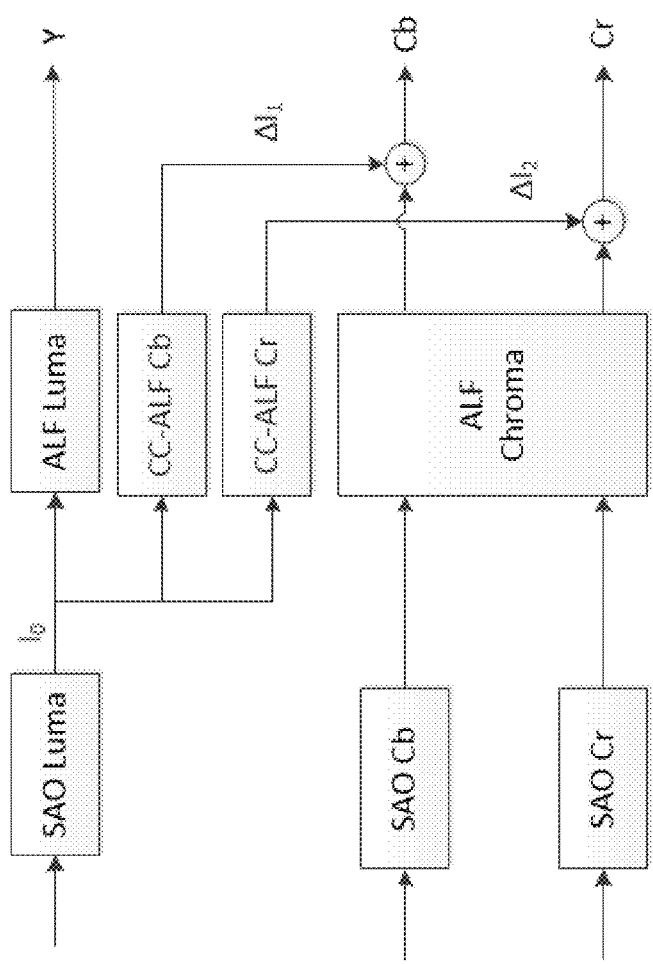
FIG. 8 shows examples of a system including ALF and cross-component (CC)-ALF.

Cross-Component Adaptive Loop Filter (CC-ALF) can further enhance each chroma component on top of the previously described ALF. The goal of CC-ALF is to use luma sample values to refine each chroma component. This is achieved by applying a diamond-shaped high-pass linear filter and then using the output of this filtering operation for the chroma refinement. FIG. 8 provides a system level diagram of the CC-ALF process with respect to the other loop filters. As shown in FIG. 8, the CC-ALF uses the same inputs as the luma ALF to avoid additional steps in the whole loop-filter process.

4. TECHNICAL PROBLEMS SOLVED BY DISCLOSED SOLUTIONS

The existing design in the latest VVC text (in JVET-Q2001-vE/v15) has the following problems:
1) The value of slice_type is constrained as follows:
   When nal_unit_type is in the range of IDR_W_RADL to CRA_NUT, inclusive, and vps_independent_layer_flag[GeneralLayerIdx[nuh_layer_id]] is equal to 1, slice_type shall be equal to 2.
   However, under the following two conditions, the value of slice_type also has to be equal to 2: i) when intra_only_constraint_flag is equal to 1; and ii) when the NAL unit type is an TRAP NAL unit type and the current picture is the first picture in the current AU.
2) The semantics of ph_alf_enabled_flag, which is defined as follows, is ambiguous.
   *ph_alf_enabled_flag* equal to 1 specifies that adaptive loop filter is enabled for all slices associated with the PH and may be applied to Y, Cb, or Cr colour component in the slices. ph_alf_enabled_flag equal to 0 specifies that adaptive loop filter may be disabled for one, or more, or all slices associated with the PH. When not present, ph_alf_enabled_flag is inferred to be equal to 0.

3) The conformance window parameters are always signalled in the PPS, including when the picture width and height are identical to the maximum picture width and height signalled in the SPS referenced by the PPS. On the other hand, the conformance window parameters for pictures with the maximum picture width and height are also signalled in the SPS. The signalling of the conformance window parameters for pictures with the maximum picture width and height in the PPS is redundant.

4) The repetition of majority of the SEI messages is limited to be at most 4 times within a PU or DU. Repetition of PH, AUD, EOS, and EOB NAL units is disallowed. Repetition of filler data NAL units needs to be allowed as many times as needed (e.g., to achieve a constant bit rate). However, there is no limit on the repetition times of other non-VCL NAL units, i.e., VPS, SPS, PPS, APS, and DCI NAL units.

5. A LISTING OF TECHNICAL SOLUTIONS

To solve the above problems, and others, methods as summarized below are disclosed. These embodiments should be considered as examples to explain the general concepts and should not be interpreted in a narrow way. Furthermore, these embodiments can be applied individually or combined in any manner.

1) To solve problem 1, a constraint on the slice_type and/or signalling of slice_type may be dependent on conditions related to general constraint flag/NAL unit type/whether the current picture is the first picture in the current AU.
   a. In one example, the condition may include:
      i. When intra_only_constraint_flag is equal to 1.
      ii. When the NAL unit type is an TRAP NAL unit type and the current picture is the first picture in the current AU.
      iii. When an indication (e.g., a SPS flag) tells that only intra slices are allowed in the picture (or the CLVS containing the current picture, or any other set of pictures containing the current picture).
   b. The constraint on the slice_type value may be updated such that additionally under either one of the first two conditions or one of all of the above conditions is true, the value of slice_type is also required to be equal to 2.
   c. Alternatively, the signalling of slice_type may be skipped and inferred to be I slice (i.e., slice_type is 2) when either one of the first two conditions or one of all of above conditions is true.
   d. Furthermore, the signalling of slice_type may also be skipped and inferred to be I slice when the NAL unit type is an TRAP NAL unit type and the current layer is an independent layer.
2) To solve problem 2, it may be specified that ph_alf_enabled_flag equal to 0 specifies that ALF is disabled for all slices of the current picture.
3) To solve problem 3, it may be required that the value of pps_conformance_window_flag shall be equal to 0 when the picture width and height are the maximum picture width and height.
   a. Additionally, it may be specified to infer the values of the PPS conformance window syntax elements to be the same as those signalled in the SPS if the picture width and height are the maximum picture width and height, and to be equal to 0 otherwise.
4) To solve problem 4, one or more of the following constraints may be specified, to provide some limits on the repetition times of VPS, SPS, PPS, APS, and DCI NAL units while not affecting functionalities like random access:
   On VPS
   a. When a VPS NAL unit with a particular value of vps_video_parameter_set_id is present in a CVS, the VPS NAL unit shall be present in the first AU of the CVS, may be present in any AU that has at least one VCL NAL unit having nal_unit_type in the range of IDR_W_RADL to GDR_NUT, inclusive, and shall not be present in any other AU.
      i. Alternatively, "IDR_W_RADL to GDR_NUT" in the above is changed to be "IDR_W_RADL to RSV_IRAP_12".
   b. The number of VPS NAL units with a particular value of vps_video_parameter_set_id in a PU shall not be greater than 1.
   On SPS
   c. Let the associated AU set of a CLVS be the set of AUs starting from the AU containing the first picture of the CLVS in decoding order to the AU containing the last picture of the CLVS in decoding order, inclusive.
   d. When an SPS NAL unit with a particular value of sps_seq_parameter_set_id is present in the associated AU set associatedAuSet of a CLVS that refers to the SPS, the SPS NAL unit shall be present in the first AU of associatedAuSet, and may be present in any AU of associatedAuSet that has at least one VCL NAL unit having nal_unit_type in the range of IDR_W_RADL to GDR_NUT, inclusive, and shall not be present in any other AU.
      i. Alternatively, when an SPS NAL unit with a particular value of sps_seq_parameter_set_id is present in a CLVS, it shall be present in the first PU of the CLVS, and may be present in any PU that has at least one coded slice NAL unit having nal_unit_type in the range of IDR_W_RADL to GDR_NUT, inclusive, and shall not be present in any other PU.
      ii. Alternatively, in items 4.d or 4.d.i, change "IDR_W_RADL to GDR_NUT" to "IDR_W_RADL to RSV_IRAP_12".
   e. The number of SPS NAL units with a particular value of sps_seq_parameter_set_id in a PU shall not be greater than 1.
   On PPS
   f. The number of PPS NAL units with a particular value of pps_pic_parameter_set_id in a PU shall not be greater than 1.
   On APS
   g. The number of APS NAL units with a particular value of adaptation_parameter_set_id and a particular value of aps_params_type in a PU shall not be greater than 1.

i. Alternatively, the number of APS NAL units with a particular value of adaptation_parameter_set_id and a particular value of aps_params_type in a DU shall not be greater than 1.

On DCI h. When a DCI NAL unit is present in a bitstream, it shall be present in the first CVS of the bitstream.

i. When a DCI NAL unit is present in a CVS, it shall be present in the first AU of the CVS, may be present in any AU that has at least one VCL NAL unit having nal_unit_type in the range of IDR_W_RADL to GDR_NUT, inclusive, and shall not be present in any other AU.

j. The number of DCI NAL units in a PU shall not be greater than 1.

6. EMBODIMENT EXAMPLES

Below are some example embodiments for some of the embodiments summarized above in Section 5, which can be applied to the VVC specification. The changed texts are based on the latest VVC text in JVET-Q2001-vE/v15. Most relevant parts that have been added or modified are highlighted in *boldface italics,* and some of the deleted parts are highlighted in bold face with [[double square brackets]]. There are some other changes that are editorial in nature or not part of the disclosed embodiments and thus not highlighted.

6.1. First Embodiment

This embodiment is for item 1.
The following constraint:
When nal_unit_type is in the range of IDR_W_RADL to CRA_NUT, inclusive, and vps_independent_layer_flag[GeneralLayerIdx[nuh_layer_id]] is equal to 1, slice_type shall be equal to 2.
is changed as follows:
When *intra_only_constraint_ flag is equal to 1 or* both of the following conditions are true, the value of slice_type shall be equal to 2:
The value of nal_unit_type is in the range of IDR_W_RADL to CRA_NUT, inclusive.
The value of vps_independent_layer_flag[GeneralLayerIdx[nuh_layer_id]] is equal to 1 *or the current picture is the first picture in the current AU.*

6.2. Second Embodiment

This embodiment is for item 2.
The semantics of ph_alf_enabled_flag is proposed to be updated as follows:
ph_alf_enabled_flag equal to 0 specifies that adaptive loop filter is [[may be]] disabled for [[one, or more, or]] all slices associated with the PH.

6.3. Third Embodiment

This embodiment is for item 3.

7.4.3.4 Picture Parameter Set RBSP Semantics pps_conformance_window_flag equal to 1 *specifies* [[indicates]]that the conformance cropping window offset parameters follow next in the PPS. pps_conformance_window_flag equal to 0 specifies [[indicates]]that the conformance cropping window offset parameters are not present in the PPS. *When pic_width_in_luma_ samples is equal to pic_ width_max_in_luma_ samples and pic_height_in_luma_samples is equal to pic_height_ max_in_luma_samples, the value of pps_conformance_ window_flag shall be equal to 0.* pps_conf_win_left_offset, pps_conf_win_right_offset, pps_conf_win_top_offset, and pps_conf_win_bottom_offset specify the samples of the pictures in the CLVS that are output from the decoding process, in terms of a rectangular region specified in picture coordinates for output.

When pps_conformance_window_flag is equal to 0, *the following applies:*
  If pic_width_in_luma_ samples is equal to pic_width_max_in_ luma_samples and pic_height_in_luma_ samples is equal to pic_height_max_in_luma_ samples, the values of pps_conf_win_left_offset, pps_conf_win_right_offset, pps_conf_win_top_offset, and pps_conf_win_bottom_ offset are inferred to be equal to sps_conf_ _win_left_offset, sps_conf_win_right_offset, sps_conf_win_top_offset, and sps_conf_win_ bottom_offset, respectively.
  Otherwise, the values of pps_conf_win_left_offset, pps_conf_win_right_offset, pps_conf_win_top_offset, and pps_conf_win_bottom_offset are inferred to be equal to 0.

The conformance cropping window contains the luma samples with horizontal picture coordinates from SubWidthC*pps_conf_win_left_offset to pic_width_in_luma_samples−(SubWidthC*pps_conf_win_right_offset+1) and vertical picture coordinates from SubHeightC*pps_conf_win_top_offset to pic_height_in_luma_samples−(SubHeightC*pps_conf_win_bottom_offset+1), inclusive. The value of SubWidthC*(pps_conf_win_left_offset+pps_conf_win_right_offset) shall be less than pic_width_in_luma_samples, and the value of SubHeightC*(pps_conf_win_top_offset+pps_conf_win_bottom_offset) shall be less than pic_height_in_luma_samples.

When ChromaArrayType is not equal to 0, the corresponding specified samples of the two chroma arrays are the samples having picture coordinates (x/SubWidthC, y/SubHeightC), where (x, y) are the picture coordinates of the specified luma samples.

NOTE 2—The conformance cropping window offset parameters are only applied at the output.
  All internal decoding processes are applied to the uncropped picture size.

Let ppsA and ppsB be any two PPSs referring to the same SPS. It is a requirement of bitstream conformance that, when ppsA and ppsB have the same the values of pic_width_in_luma_samples and pic_height_in_luma_samples, respectively, ppsA and ppsB shall have the same values of pps_conf_win_left_offset, pps_conf_win_right_offset, pps_conf_win_top_offset, and pps_conf_win_bottom_offset, respectively.

When pic_width_in_luma_samples is equal to pic_width_max_in_luma_samples and pic_height_in_luma_samples is equal to pic_height_max_in_luma_samples, it is a requirement of bitstream conformance that pps_conf_win_left_offset, pps_conf_win_right_offset, pps_conf_win_top_offset, and pps_conf_win_bottom_offset, are equal to sps_conf_win_left_offset, sps_conf_win_right_offset, sps_conf_win_top_offset, and sps_conf_win_bottom_offset, respectively.

FIG. 1 is a block diagram showing an example video processing system 1900 in which various embodiments disclosed herein may be implemented. Various implementations may include some or all of the components of the system 1900. The system 1900 may include input 1902 for receiving video content. The video content may be received in a raw or uncompressed format, e.g., 8- or 10-bit multi-component pixel values, or may be in a compressed or encoded format. The input 1902 may represent a network interface, a peripheral bus interface, or a storage interface. Examples of network interface include wired interfaces such as Ethernet, passive optical network (PON), etc., and wireless interfaces such as Wi-Fi or cellular interfaces.

The system 1900 may include a coding component 1904 that may implement the various coding or encoding methods described in the present disclosure. The coding component 1904 may reduce the average bitrate of video from the input 1902 to the output of the coding component 1904 to produce a coded representation of the video. The coding techniques are therefore sometimes called video compression or video transcoding techniques. The output of the coding component 1904 may be either stored, or transmitted via a communication connected, as represented by the component 1906. The stored or communicated bitstream (or coded) representation of the video received at the input 1902 may be used by the component 1908 for generating pixel values or displayable video that is sent to a display interface 1910. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or DisplayPort, and so on. Examples of storage interfaces include serial advanced technology attachment (SATA), peripheral component interface (PCI), integrated drive electronics (IDE) interface, and the like. The embodiments described in the present disclosure may be embodied in various electronic devices such as mobile phones, laptops, smartphones or other devices that are capable of performing digital data processing and/or video display.

Figure 2:
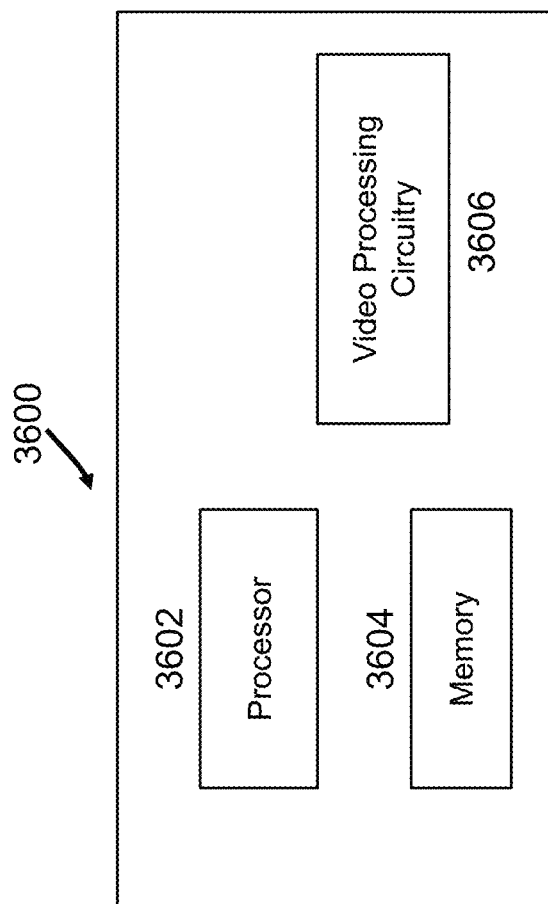
FIG. 2 is a block diagram of a video processing apparatus.

FIG. 2 is a block diagram of a video processing apparatus 3600. The apparatus 3600 may be used to implement one or more of the methods described herein. The apparatus 3600 may be embodied in a smartphone, tablet, computer, Internet of Things (IoT) receiver, and so on. The apparatus 3600 may include one or more processors 3602, one or more memories 3604 and video processing hardware 3606. The processor(s) 3602 may be configured to implement one or more methods described in the present disclosure. The memory (memories) 3604 may be used for storing data and code used for implementing the methods and embodiments described herein. The video processing hardware 3606 may be used to implement, in hardware circuitry, some embodiments described in the present disclosure.

Figure 4:
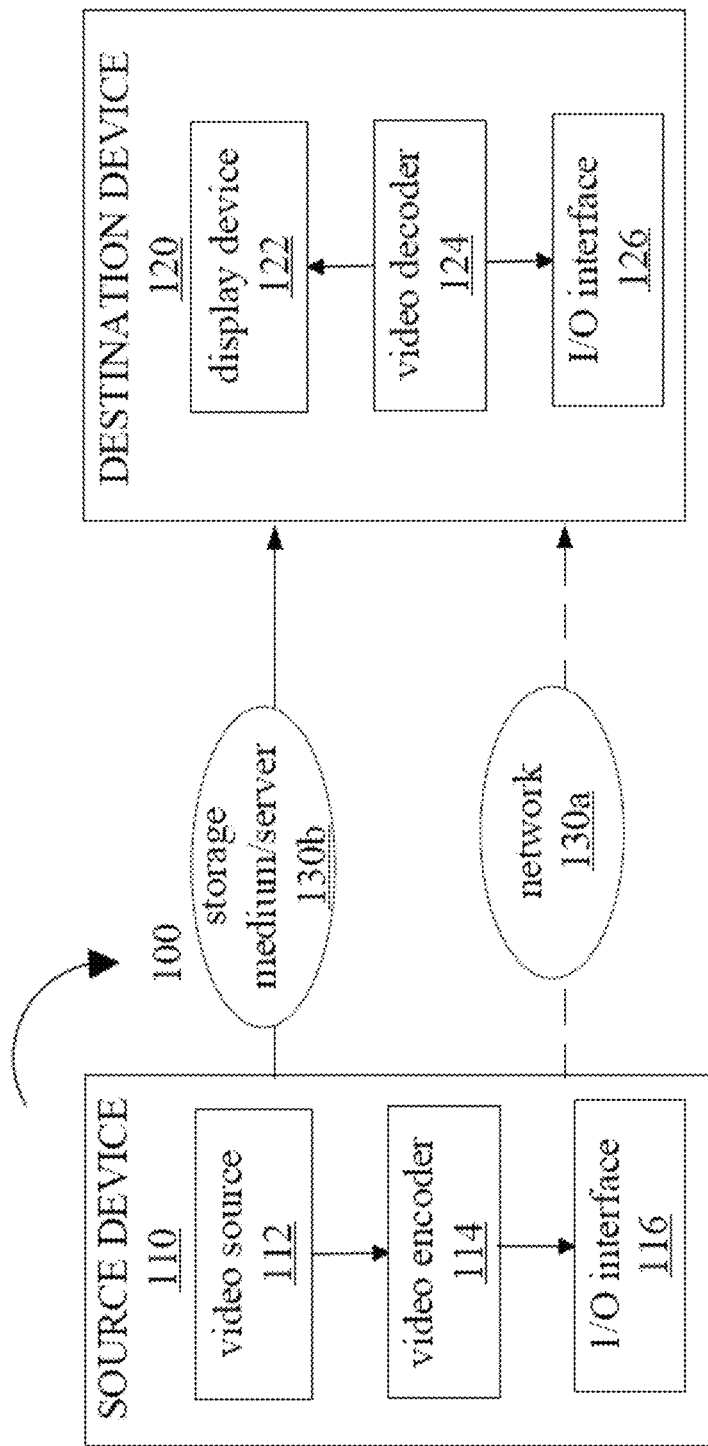
FIG. 4 is a block diagram that illustrates a video coding system in accordance with some embodiments of the present disclosure.

FIG. 4 is a block diagram that illustrates an example video coding system 100 that may utilize the embodiments of this disclosure.

As shown in FIG. 4, video coding system 100 may include a source device 110 and a destination device 120. Source device 110 generates encoded video data which may be referred to as a video encoding device. Destination device 120 may decode the encoded video data generated by source device 110 which may be referred to as a video decoding device.

Source device 110 may include a video source 112, a video encoder 114, and an input/output (I/O) interface 116.

Video source 112 may include a source such as a video capture device, an interface to receive video data from a video content provider, and/or a computer graphics system for generating video data, or a combination of such sources. The video data may comprise one or more pictures. Video encoder 114 encodes the video data from video source 112 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. I/O interface 116 may include a modulator/demodulator (modem) and/or a transmitter. The encoded video data may be transmitted directly to destination device 120 via I/O interface 116 through network 130a. The encoded video data may also be stored onto a storage medium/server 130b for access by destination device 120.

Destination device 120 may include an I/O interface 126, a video decoder 124, and a display device 122.

I/O interface 126 may include a receiver and/or a modem. I/O interface 126 may acquire encoded video data from the source device 110 or the storage medium/server 130b. Video decoder 124 may decode the encoded video data. Display device 122 may display the decoded video data to a user. Display device 122 may be integrated with the destination device 120, or may be external to destination device 120 which be configured to interface with an external display device.

Video encoder 114 and video decoder 124 may operate according to a video compression standard, such as the High Efficiency Video Coding (HEVC) standard, Versatile Video Coding (VVC) standard and other current and/or further standards.

Figure 5:
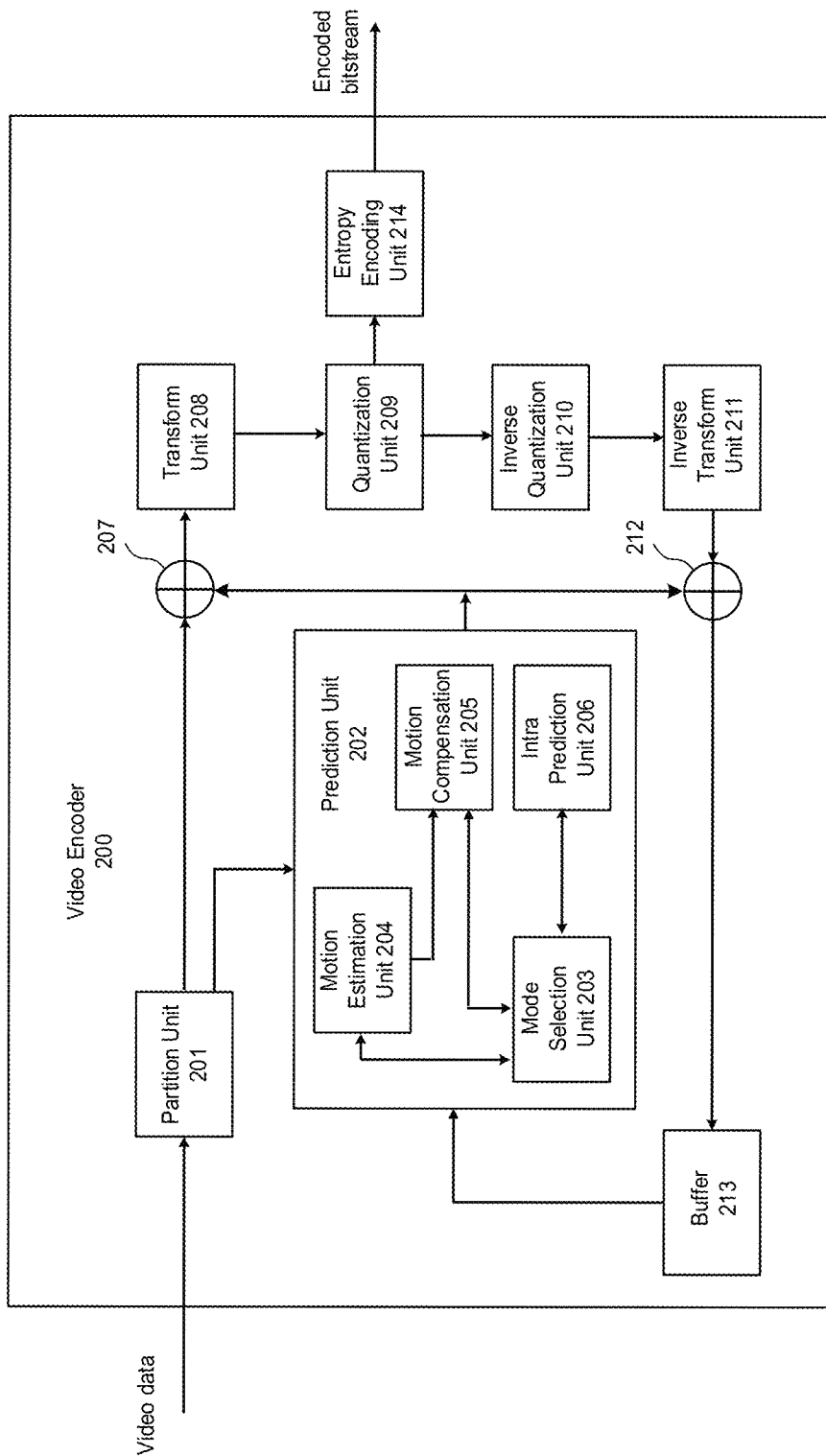
FIG. 5 is a block diagram that illustrates an encoder in accordance with some embodiments of the present disclosure.

FIG. 5 is a block diagram illustrating an example of video encoder 200, which may be video encoder 114 in the system 100 illustrated in FIG. 4.

Video encoder 200 may be configured to perform any or all of the embodiments of this disclosure. In the example of FIG. 5, video encoder 200 includes a plurality of functional components. The embodiments described in this disclosure may be shared among the various components of video encoder 200. In some examples, a processor may be configured to perform any or all of the embodiments described in this disclosure.

The functional components of video encoder 200 may include a partition unit 201, a prediction unit 202 which may include a mode select unit 203, a motion estimation unit 204, a motion compensation unit 205 and an intra prediction unit 206, a residual generation unit 207, a transform unit 208, a quantization unit 209, an inverse quantization unit 210, an inverse transform unit 211, a reconstruction unit 212, a buffer 213, and an entropy encoding unit 214.

In other examples, video encoder 200 may include more, fewer, or different functional components. In an example, prediction unit 202 may include an intra block copy (IBC) unit. The IBC unit may perform prediction in an IBC mode in which at least one reference picture is a picture where the current video block is located.

Furthermore, some components, such as motion estimation unit 204 and motion compensation unit 205 may be highly integrated, but are represented in the example of FIG. 5 separately for purposes of explanation.

Partition unit 201 may partition a picture into one or more video blocks. Video encoder 200 and video decoder 300 (of FIG. 6) may support various video block sizes.

Mode select unit 203 may select one of the coding modes, intra or inter, e.g., based on error results, and provide the resulting intra- or inter-coded block to a residual generation unit 207 to generate residual block data and to a reconstruction unit 212 to reconstruct the encoded block for use as a reference picture. In some examples, mode select unit 203 may select a combination of intra and inter prediction (CIIP) mode in which the prediction is based on an inter prediction signal and an intra prediction signal. Mode select unit 203 may also select a resolution for a motion vector (e.g., a sub-pixel or integer pixel precision) for the block in the case of inter-prediction.

To perform inter prediction on a current video block, motion estimation unit 204 may generate motion information for the current video block by comparing one or more reference frames from buffer 213 to the current video block. Motion compensation unit 205 may determine a predicted video block for the current video block based on the motion information and decoded samples of pictures from buffer 213 other than the picture associated with the current video block.

Motion estimation unit 204 and motion compensation unit 205 may perform different operations for a current video block, for example, depending on whether the current video block is in an I slice, a P slice, or a B slice.

In some examples, motion estimation unit 204 may perform uni-directional prediction for the current video block, and motion estimation unit 204 may search reference pictures of list 0 or list 1 for a reference video block for the current video block. Motion estimation unit 204 may then generate a reference index that indicates the reference picture in list 0 or list 1 that contains the reference video block and a motion vector that indicates a spatial displacement between the current video block and the reference video block. Motion estimation unit 204 may output the reference index, a prediction direction indicator, and the motion vector as the motion information of the current video block. Motion compensation unit 205 may generate the predicted video block of the current block based on the reference video block indicated by the motion information of the current video block.

In other examples, motion estimation unit 204 may perform bi-directional prediction for the current video block, motion estimation unit 204 may search the reference pictures in list 0 for a reference video block for the current video block and may also search the reference pictures in list 1 for another reference video block for the current video block. Motion estimation unit 204 may then generate reference indexes that indicate the reference pictures in list 0 and list 1 containing the reference video blocks and motion vectors that indicate spatial displacements between the reference video blocks and the current video block. Motion estimation unit 204 may output the reference indexes and the motion vectors of the current video block as the motion information of the current video block. Motion compensation unit 205 may generate the predicted video block of the current video block based on the reference video blocks indicated by the motion information of the current video block.

In some examples, motion estimation unit 204 may output a full set of motion information for decoding processing of a decoder.

In some examples, motion estimation unit 204 may not output a full set of motion information for the current video. Rather, motion estimation unit 204 may signal the motion information of the current video block with reference to the motion information of another video block. For example, motion estimation unit 204 may determine that the motion information of the current video block is sufficiently similar to the motion information of a neighboring video block.

In one example, motion estimation unit 204 may indicate, in a syntax structure associated with the current video block, a value that indicates to the video decoder 300 that the current video block has the same motion information as the another video block.

In another example, motion estimation unit 204 may identify, in a syntax structure associated with the current video block, another video block and a motion vector difference (MVD). The motion vector difference indicates a difference between the motion vector of the current video block and the motion vector of the indicated video block. The video decoder 300 may use the motion vector of the indicated video block and the motion vector difference to determine the motion vector of the current video block.

As discussed above, video encoder 200 may predictively signal the motion vector. Two examples of predictive signalling techniques that may be implemented by video encoder 200 include advanced motion vector prediction (AMVP) and merge mode signalling.

Intra prediction unit 206 may perform intra prediction on the current video block. When intra prediction unit 206 performs intra prediction on the current video block, intra prediction unit 206 may generate prediction data for the current video block based on decoded samples of other video blocks in the same picture. The prediction data for the current video block may include a predicted video block and various syntax elements.

Residual generation unit 207 may generate residual data for the current video block by subtracting (e.g., indicated by the minus sign) the predicted video block(s) of the current video block from the current video block. The residual data of the current video block may include residual video blocks that correspond to different sample components of the samples in the current video block.

In other examples, there may be no residual data for the current video block for the current video block, for example in a skip mode, and residual generation unit 207 may not perform the subtracting operation.

Transform processing unit 208 may generate one or more transform coefficient video blocks for the current video block by applying one or more transforms to a residual video block associated with the current video block.

After transform processing unit 208 generates a transform coefficient video block associated with the current video block, quantization unit 209 may quantize the transform coefficient video block associated with the current video block based on one or more quantization parameter (QP) values associated with the current video block.

Inverse quantization unit 210 and inverse transform unit 211 may apply inverse quantization and inverse transforms to the transform coefficient video block, respectively, to reconstruct a residual video block from the transform coefficient video block. Reconstruction unit 212 may add the reconstructed residual video block to corresponding samples from one or more predicted video blocks generated by the prediction unit 202 to produce a reconstructed video block associated with the current block for storage in the buffer 213.

After reconstruction unit 212 reconstructs the video block, loop filtering operation may be performed reduce video blocking artifacts in the video block.

Entropy encoding unit 214 may receive data from other functional components of the video encoder 200. When entropy encoding unit 214 receives the data, entropy encoding unit 214 may perform one or more entropy encoding operations to generate entropy encoded data and output a bitstream that includes the entropy encoded data.

Figure 6:
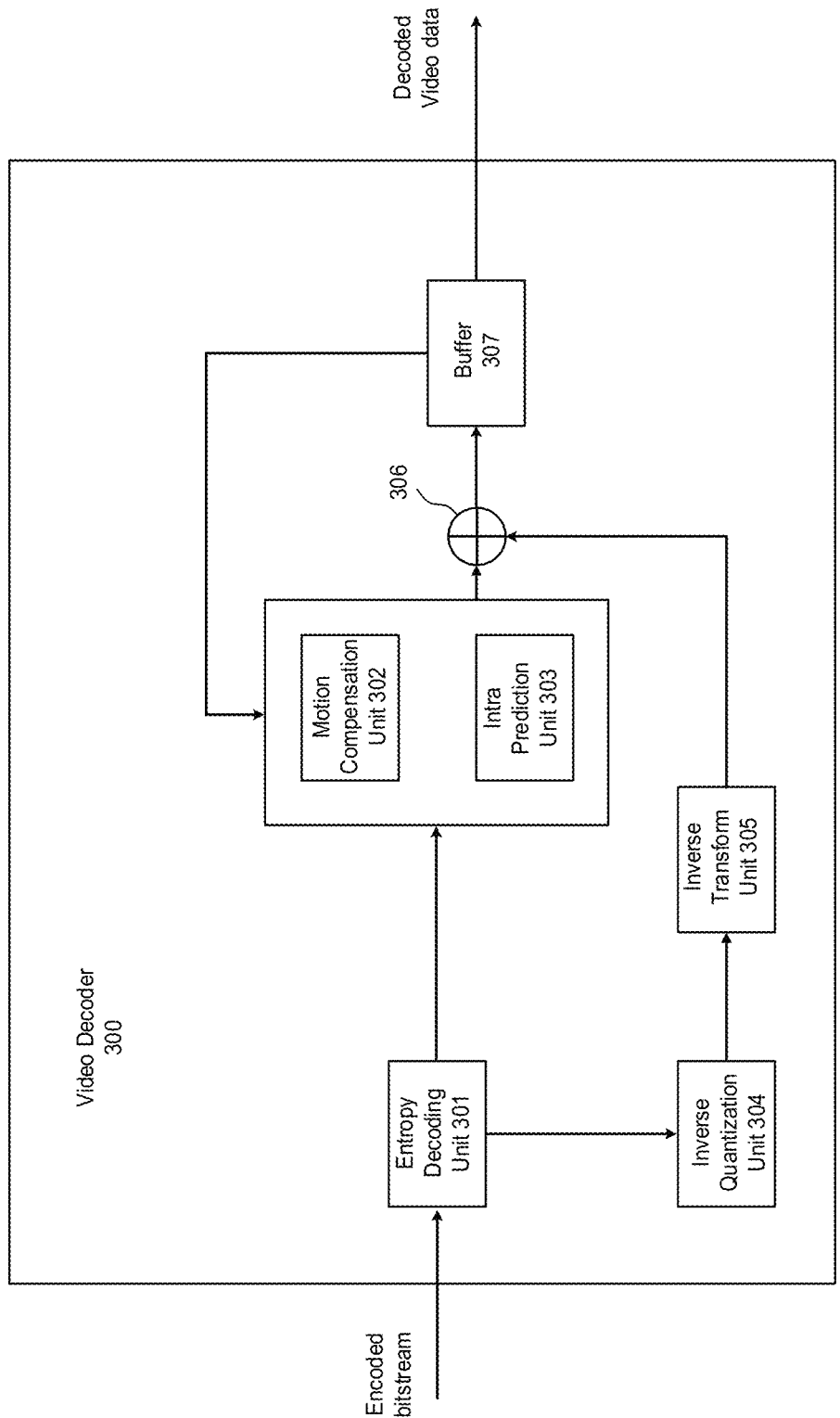
FIG. 6 is a block diagram that illustrates a decoder in accordance with some embodiments of the present disclosure.

FIG. 6 is a block diagram illustrating an example of video decoder 300 which may be video decoder 124 in the system 100 illustrated in FIG. 4.

The video decoder 300 may be configured to perform any or all of the embodiments of this disclosure. In the example of FIG. 6, the video decoder 300 includes a plurality of functional components. The embodiments described in this disclosure may be shared among the various components of the video decoder 300. In some examples, a processor may be configured to perform any or all of the embodiments described in this disclosure.

In the example of FIG. 6, video decoder 300 includes an entropy decoding unit 301, a motion compensation unit 302, an intra prediction unit 303, an inverse quantization unit 304, an inverse transformation unit 305, a reconstruction unit 306, and a buffer 307. Video decoder 300 may, in some examples, perform a decoding pass generally reciprocal to the encoding pass described with respect to video encoder 200 (FIG. 5).

Entropy decoding unit 301 may retrieve an encoded bitstream. The encoded bitstream may include entropy coded video data (e.g., encoded blocks of video data). Entropy decoding unit 301 may decode the entropy coded video data, and from the entropy decoded video data, motion compensation unit 302 may determine motion information including motion vectors, motion vector precision, reference picture list indexes, and other motion information. Motion compensation unit 302 may, for example, determine such information by performing the AMVP and merge mode.

Motion compensation unit 302 may produce motion compensated blocks, possibly performing interpolation based on interpolation filters. Identifiers for interpolation filters to be used with sub-pixel precision may be included in the syntax elements.

Motion compensation unit 302 may use interpolation filters as used by video encoder 200 during encoding of the video block to calculate interpolated values for sub-integer pixels of a reference block. Motion compensation unit 302 may determine the interpolation filters used by video encoder 200 according to received syntax information and use the interpolation filters to produce predictive blocks.

Motion compensation unit 302 may uses some of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence.

Intra prediction unit 303 may use intra prediction modes for example received in the bitstream to form a prediction block from spatially adjacent blocks. Inverse quantization unit 304 inverse quantizes, i.e., de-quantizes, the quantized video block coefficients provided in the bitstream and decoded by entropy decoding unit 301. Inverse transform unit 305 applies an inverse transform.

Reconstruction unit 306 may sum the residual blocks with the corresponding prediction blocks generated by motion compensation unit 302 or intra prediction unit 303 to form decoded blocks. If desired, a deblocking filter may also be applied to filter the decoded blocks in order to remove blockiness artifacts. The decoded video blocks are then stored in buffer 307, which provides reference blocks for subsequent motion compensation/intra prediction and also produces decoded video for presentation on a display device.

A listing of solutions preferred by some embodiments is provided next.

The following solutions show example embodiments of techniques discussed in the previous section (e.g., item 1).

Figure 3:
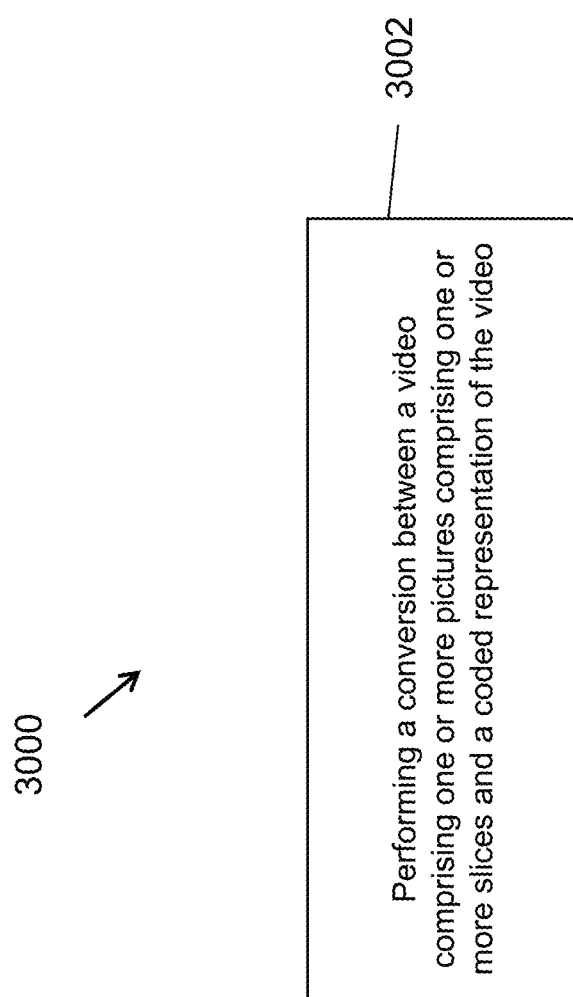
FIG. 3 is a flowchart for an example method of video processing.

1. A video processing method (e.g., method 3000 shown in FIG. 3), comprising performing (3002) a conversion between a video comprising one or more pictures comprising one or more slices and a coded representation of the video, wherein the coded representation conforms to a format rule that specifies that a condition of a field in the coded representation controls a constraint on a slice type or whether the slice type is included in the coded representation for a video slice, wherein the field comprises a general constraint flag, a network abstraction layer unit type or whether the video slice is in a first video picture of an access unit.

2. The method of solution 1, wherein the format rule specifies that the condition is that an intra-only constraint has been enabled for the video slice.

The following solutions show example embodiments of techniques discussed in the previous section (e.g., item 2).

3. A video processing method, comprising: performing a conversion between a video comprising one or more pictures comprising one or more slices and a coded representation of the video, wherein the coded representation conforms to a format rule that specifies to disable adaptive loop filtering of all slices in a video picture based on a value of a flag in a picture header of the video picture.

The following solutions show example embodiments of techniques discussed in the previous section (e.g., item 3).

4. A video processing method, comprising: performing a conversion between a video comprising one or more pictures comprising one or more slices and a coded representation of the video, wherein the coded representation conforms to a format rule that specifies that a conformance window flag is set to a disable mode in case that a height and a width of a current picture are equal to a maximum height and a maximum width in the video.

The following solutions show example embodiments of techniques discussed in the previous section (e.g., item 4).

5. A video processing method, comprising: performing a conversion between a video comprising one or more pictures comprising one or more slices and a coded representation of the video, wherein the coded representation conforms to a format rule that specifies a repetition time for a parameter set.

6. The method of solution 5, wherein the parameter set a video parameter set or a sequence parameter set or a picture parameter set of an adaptation parameter set.

7. The method of solution 5, wherein the parameter set is a decoding capability information network abstraction layer unit (DCI NAL).

8. The method of solution 6, wherein the parameter set is the video parameter set, and wherein the format rule specifies that in case that the video parameter set includes a particular value of an identifier field, the video parameter set is included in a first access unit of the coded video representation.

9. The method of solution 8, wherein the format rule further specifies to include the video parameter set having the particular value of the identifier field if and only if another access unit has a network abstraction layer type in a range between two pre-specified values.

10. The method of solution 6, wherein the parameter set is a sequence parameter set, and wherein the format rule specifies that the coded representation is organized as one or more access units of one or more coded layers of video sequence, and wherein the format rule specifies to include a network abstraction layer that includes the sequence parameter set with a particular identifier value in a first access unit of a set of access units that refer to the sequence parameter set.

11. The method of solution 7, wherein the format rule specifies that, in a case that the DCI NAL is included in the coded representation of the video, the DCI NAL is included in a first coded video sequence of the video.

12. The method of solutions 7 or 11, wherein the format rule further specifies to limit a number of DCI NAL units in a prediction unit to one.

13. The method of any of solutions 1 to 12, wherein the conversion comprises encoding the video into the coded representation.

14. The method of any of solutions 1 to 12, wherein the conversion comprises decoding the coded representation to generate pixel values of the video.

15. A video decoding apparatus comprising a processor configured to implement a method recited in one or more of solutions 1 to 14.

16. A video encoding apparatus comprising a processor configured to implement a method recited in one or more of solutions 1 to 14.

17. A computer program product having computer code stored thereon, the code, when executed by a processor, causes the processor to implement a method recited in any of solutions 1 to 14.

18. A method, apparatus or system described in the present disclosure.

The following listing provides a second set of preferred solutions implemented by some embodiments.

The following solutions show example embodiments of techniques discussed in the previous section (e.g., item 1).

1. A video processing method (e.g., method 3000 depicted in FIG. 3), comprising: performing (3002) a conversion between a video comprising one or more pictures comprising one or more slices and a bitstream of the video, wherein the bitstream conforms to a format rule; wherein the format rule specifies whether or how a slice type of a slice of the one or more slices is indicated in the bitstream depends on a condition, wherein the condition is based on at least one of a general constraint flag, a network abstraction layer unit type or whether the slice is in a first picture of an access unit.

2. The method of solution 1, wherein the condition comprises or corresponds to that the general constraint flag indicates an intra-only constraint for the slice.

3. The method of solution 1, wherein the condition comprises or corresponds to that the slice is in the first picture of the access unit and the network abstraction layer unit type has a specific type, wherein the specific type indicates an intra random access point type.

4. The method of solution 1, wherein the condition comprises or corresponds to that the bitstream indicates that only intra slices are permitted in a set of pictures that include the picture.

5. The method of solution 4, wherein the set of pictures corresponds to the picture.

6. The method of solution 4, wherein the set of pictures corresponds to a coded layer video sequence (CLVS) that includes the picture.

7. The method of any of solutions 1-6, wherein the format rule specifies that the slice type value 2 is indicated in the bitstream responsive to: (a) the general constraint flag or the network abstraction layer unit type meet the condition, or (b) the slice is in the first picture of the access unit.

8. The method of solution 1, wherein the format rule specifies that the slice type has a value 2 and an indication of the slice type is omitted from the bitstream responsive to: (a) the general constraint flag or the network abstraction layer unit type meet the condition, or (b) the slice is in the first picture of the access unit.

9. The method of solution 1, wherein the format rule specifies that the slice type has a value 2 and an indication of the slice type is omitted from the bitstream responsive to: (a) the network abstraction layer unit type is an intra random access point type, and (b) a layer to which the picture containing the slice belongs is an independently decodable layer.

The following solutions show additional examples of example embodiments of techniques discussed in the previous section (e.g., items 2 and 4).

Figure 9:
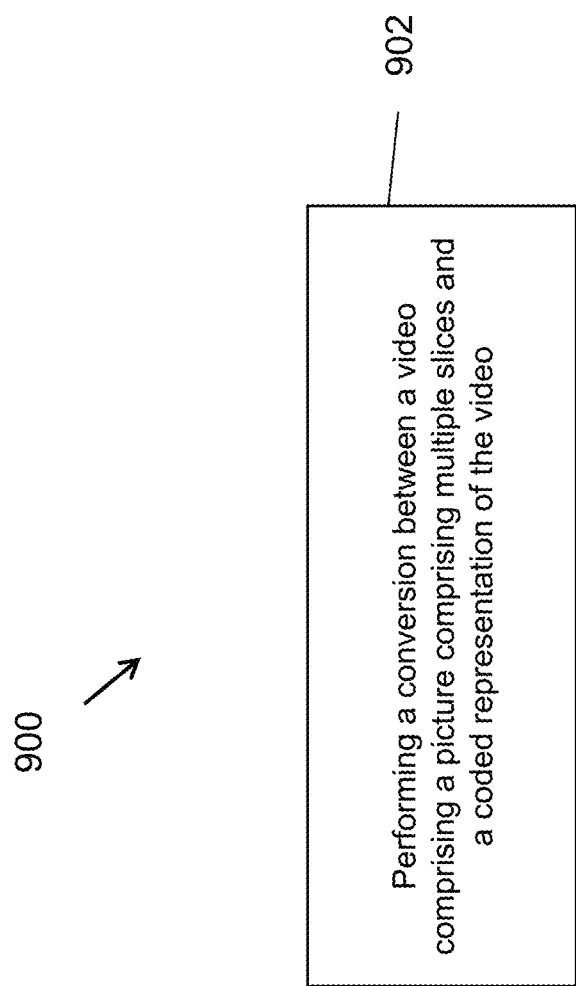
FIGS. 9-11 show flowcharts for example methods of video processing.

1. A video processing method (e.g., method 900 depicted in FIG. 9), comprising: performing (902) a conversion between a video comprising a picture comprising multiple slices and a bitstream of the video, wherein the bitstream conforms to a format rule that specifies that a flag in a picture header controls applicability of adaptive loop filtering of all slices in the picture.

2. The method of solution 1, wherein a zero value of the flag indicates that the adaptive loop filtering is disabled for all slices in the picture.

3. The method of solution 1, wherein a one value of the flag indicates that the adaptive loop filtering is enabled for all slices in the picture.

Figure 10:
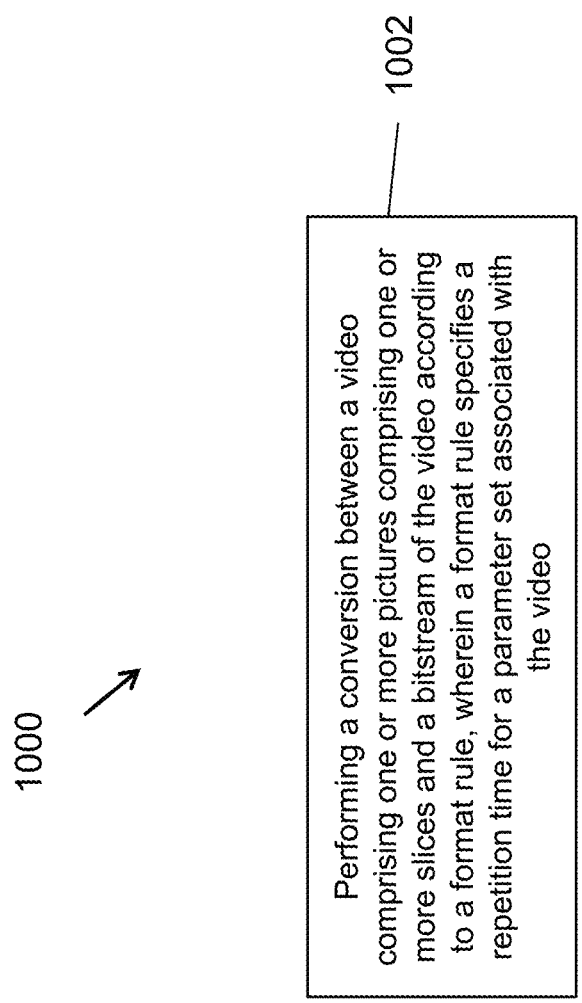

4. A video processing method (e.g., method 1000 depicted in FIG. 10), comprising: performing (1002) a conversion between a video comprising one or more pictures comprising one or more slices and a bitstream of the video according to a format rule, wherein a format rule specifies a repetition time for a parameter set associated with the video.

5. The method of solution 4, wherein the parameter set is a video parameter set (VPS).

6. The method of solution 5, wherein the format rule specifies that, responsive to a VPS network abstraction layer (NAL) unit of a coded video sequence (CVS) containing a VPS having a specific identifier value, the VPS NAL unit is included in a first access unit (AU) of the CVS and selectively included in another AU of the CVS based on a value of another VPS NAL unit in the another AU and excluded from remaining AUs of the CVS.

7. The method of solution 6, wherein the value of the another VPS NAL unit in the another AU is in a range of IDR_W_RADL to GDR_NUT.

8. The method of solution 6, wherein the value of the another VPS NAL unit in the another AU is in a range of IDR_W_RADL to RSV_IRAP_12.
9. The method of any of solutions 5-8, wherein the format rule further specifies that no more than one VPS NAL unit of a given identifier value are included in a picture unit (PU) in the bitstream.
10. The method of solution 4, wherein the parameter set is a sequence parameter set (SPS).
11. The method of solution 10, wherein a coded layer video sequence (CLVS) in the bitstream includes an associated access unit (AU) set comprising AUs starting from a first AU containing a first picture of the CLVS in a decoding order and a last AU containing a last picture of the CLVS in the decoding order.
12. The method of solution 11, wherein the format rule specifies that, responsive to an SPS network abstraction layer (NAL) unit containing an SPS having a specific identifier value, the SPS NAL unit is included in the first AU of the associated AU set and selectively included in another AU of the associated set based on a value of another SPS NAL unit in the another AU and excluded from remaining AUs of the CVS.
13. The method of solution 11, wherein the format rule specifies that, responsive to a coded layer video sequence (CVLS) containing an SPS having a specific identifier value in a first picture unit (PU) of the CVLS, the SPS NAL unit is selectively included in another PU of the CVLS based on a value of a slice NAL unit in the another PU and excluded from remaining PUs of the CVLS.
14. The method of solution 12, wherein the value of the another SPS NAL unit in the another AU is in a range of IDR_W_RADL to GDR_NUT.
15. The method of solution 13, wherein the value of the slice NAL unit in the another PU is in a range of IDR_W_RADL to GDR_NUT.
16. The method of solution 12, wherein the value of the another SPS NAL unit in the another AU is in a range of IDR_W_RADL to RSV_IRAP_12.
17. The method of solution 13, wherein the value of the slice NAL unit in the another PU is in a range of IDR_W_RADL to RSV_IRAP_12.
18. The method of any of solutions 11-17, wherein the format rule further specifies that no more than one SPS NAL unit of a given identifier value are included in a picture unit (PU) in the bitstream.
19. The method of solution 4, wherein the parameter set is a picture parameter set (PPS), and wherein the format rule further specifies that no more than one PPS network abstraction layer (NAL) unit of a given identifier value are included in a picture unit (PU) in the bitstream.
20. The method of solution 4, wherein the parameter set is an adaptation parameter set (APS).
21. The method of solution 20, wherein the format rule further specifies that no more than one APS network abstraction layer (NAL) unit of a given identifier value and a particular value of parameter type are included in a picture unit (PU) in the bitstream.
22. The method of solution 20, wherein the format rule further specifies that no more than one APS network abstraction layer (NAL) unit of a given identifier value and a particular value of parameter type are included in a decoding unit (DU) in the bitstream.
23. The method of solution 4, wherein the parameter set is a decoding capability information network abstraction layer unit (DCI NAL).
24. The method of solution 23, wherein the format rule specifies that, when present, the DCI NAL unit is disallowed from including in a coded video sequence (CVS) in the bitstream that is not a first CVS in the bitstream.
25. The method of solution 23, wherein the format rule specifies that, responsive to a coded video sequence (CVS) including the DCI NAL unit, the DCI NAL unit is in a first access unit (AU) of the CVS, and selectively present in another AU selectively based on whether the another AU includes a video coding layer (VCL) NAL unit having a specific NAL unit identifier value and excluded from remaining AUs of the CVS.
26. The method of solution 21, wherein the specific identifier value is in a range of IDR_W_RADL to GDR_NUT.
27. The method of any of solutions 23-26, wherein the format rule specifies that a picture unit (PU) includes at most one DCI NAL unit.

The following solutions show an additional example of preferred embodiments of techniques discussed in the previous section (e.g., item 3).

Figure 11:
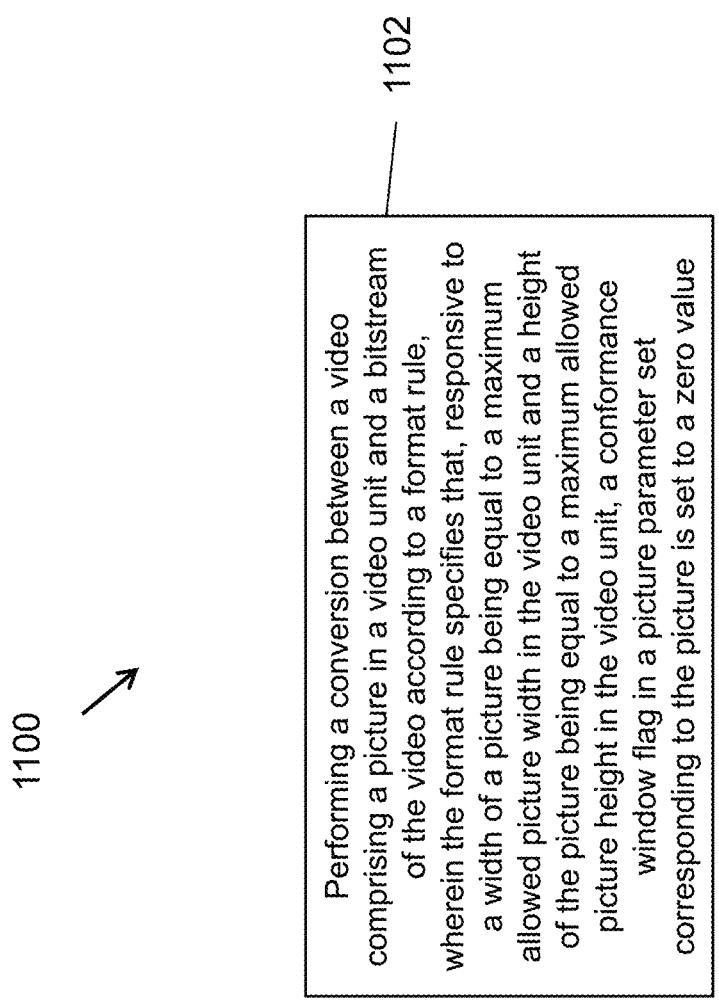

1. A video processing method (e.g., method 1100 depicted in FIG. 11), comprising: performing (1102) a conversion between a video comprising a picture in a video unit and a bitstream of the video according to a format rule, wherein the format rule specifies that, responsive to a width of a picture being equal to a maximum allowed picture width in the video unit and a height of the picture being equal to a maximum allowed picture height in the video unit, a conformance window flag in a picture parameter set corresponding to the picture is set to a zero value.
2. The method of solution 1, wherein the maximum allowed picture width and the maximum allowed picture height are indicated in a sequence parameter set referred to by the video unit.
3. The method of solution 2, wherein the format rule specifies that responsive to the width of a picture being equal to the maximum allowed picture width in the video unit and the height of the picture being equal to the maximum allowed picture height in the video unit, conformance window syntax elements are excluded from the picture parameter set and are inferred to have same values as indicated in the sequence parameter set.
4. The method of solution 2, wherein the format rule specifies that responsive to the width of a picture being not equal to the maximum allowed picture width in the video unit or the height of the picture being not equal to the maximum allowed picture height in the video unit, conformance window syntax elements are inferred to have zero values.

In the above-listed solutions, the conversion comprises encoding the video into the bitstream.

In the above-listed solutions, the conversion comprises generating the video from the bitstream.

In some embodiments, video decoding apparatus may include a processor configured to implement a method recited in one or more of above-described solutions.

In some embodiments, a video encoding apparatus comprising a processor may be configured to implement a method recited in one or more of above-described solutions.

In some embodiments, a computer readable medium may have code stored thereupon, the code, when executed by a processor, causes the processor to implement a method recited in any of above-described solutions.

In some embodiments, a method of video processing includes generating a bitstream according to a method recited in any one or more of above-described solutions, and storing the bitstream on a computer readable medium.

In some embodiments, a computer readable medium may have a bitstream stored thereon, the bitstream being generated from a video according to a method recited in any one or more of above-described solutions.

In the present disclosure, the term "video processing" may refer to video encoding, video decoding, video compression or video decompression. For example, video compression algorithms may be applied during conversion from pixel representation of a video to a corresponding bitstream representation or vice versa. The bitstream representation of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream. Furthermore, during conversion, a decoder may parse a bitstream with the knowledge that some fields may be present, or absent, based on the determination, as is described in the above solutions Similarly, an encoder may determine that certain syntax fields are or are not to be included and generate the coded representation accordingly by including or excluding the syntax fields from the coded representation.

The disclosed and other solutions, examples, embodiments, modules and the functional operations described in this disclosure can be implemented in digital electronic circuitry, or in computer software, firmware, or hardware, including the structures disclosed in this disclosure and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform functions by operating on input data and generating output. The processes and logic flows can also be performed by, and apparatus can also be implemented as, special purpose logic circuitry, e.g., a field-programmable gate array (FPGA) or an application-specific integrated circuit (ASIC).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., erasable programmable read-only memory (EPROM), electronically erasable programmable read-only memory (EEPROM), and flash memory devices; magnetic disks, e.g., internal hard disks or removable disks; magneto optical disks; and compact disc, read-only memory (CD-ROM) and digital versatile disc, read-only memory (DVD-ROM) disks. The processor and the memory can be supplemented by, or incorporated in, special purpose logic circuitry.

While the present disclosure contains many specifics, these should not be construed as limitations on the scope of any subject matter or of what may be claimed, but rather as descriptions of features that may be specific to particular embodiments of the present disclosure. Certain features that are described in the present disclosure in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in the present disclosure should not be understood as requiring such separation in all embodiments.

Only a few implementations and examples are described and other implementations, enhancements and variations can be made based on what is described and illustrated in the present disclosure.

What is claimed is:

1. A video processing method, comprising:
performing a conversion between a video comprising one or more pictures comprising one or more slices and a bitstream of the video,
wherein the bitstream conforms to a format rule,
wherein the format rule specifies that a flag in a picture header controls applicability of adaptive loop filtering of all slices in the picture,
wherein the format rule further specifies that a constraint on a syntax element included in the bitstream indicating a slice type of a slice of the one or more slices depends on a condition, and
wherein the condition is based on at least one of a general constraint flag, a network abstraction layer unit type, or whether the slice is in a first picture of an access unit.

2. The method of claim 1, wherein the condition comprises that a value of the general constraint flag is equal to 1 and indicates an intra-only constraint for the slice, and the constraint on the syntax element is that a value of the syntax element is equal to 2.

3. The method of claim 1, wherein the condition comprises that (a) the slice is in the first picture of the access unit and (b) the network abstraction layer unit type has a specific type, wherein the specific type indicates an intra random access point type, and the constraint on the syntax element is that a value of the syntax element is equal to 2.

4. The method of claim 1, wherein the condition comprises that (a) the network abstraction layer unit type is an intra random access point type, and (b) a layer to which the picture containing the slice belongs is an independently decodable layer, and the constraint on the syntax element is that a value of the syntax element is equal to 2.

5. The method of claim 1, wherein a zero value of the flag indicates that the adaptive loop filtering is disabled for all slices in the picture.

6. The method of claim 1, wherein a one value of the flag indicates that the adaptive loop filtering is enabled for all slices in the picture.

7. The method of claim 1, wherein the conversion comprises decoding the video from the bitstream.

8. The method of claim 1, wherein the conversion comprises encoding the video into the bitstream.

9. An apparatus for processing video data comprising a processor and a non-transitory memory with instructions thereon, wherein the instructions upon execution by the processor, cause the processor to:
perform a conversion between a video comprising one or more pictures comprising one or more slices and a bitstream of the video,
wherein the bitstream conforms to a format rule, and
wherein the format rule specifies that a flag in a picture header controls applicability of adaptive loop filtering of all slices in the picture,
wherein the format rule further specifies that a constraint on a syntax element included in the bitstream indicating a slice type of a slice of the one or more slices depends on a condition, and
wherein the condition is based on at least one of a general constraint flag, a network abstraction layer unit type, or whether the slice is in a first picture of an access unit.

10. The apparatus of claim 9, wherein the condition comprises that a value of the general constraint flag is equal to 1 and indicates an intra-only constraint for the slice, and the constraint on the syntax element is that a value of the syntax element is equal to 2.

11. The apparatus of claim 9, wherein the condition comprises that (a) the slice is in the first picture of the access unit and (b) the network abstraction layer unit type has a specific type, wherein the specific type indicates an intra random access point type, and the constraint on the syntax element is that a value of the syntax element is equal to 2.

12. The apparatus of claim 9, wherein the condition comprises that (a) the network abstraction layer unit type is an intra random access point type, and (b) a layer to which the picture containing the slice belongs is an independently decodable layer, and the constraint on the syntax element is that a value of the syntax element is equal to 2.

13. The apparatus of claim 9, wherein a zero value of the flag indicates that the adaptive loop filtering is disabled for all slices in the picture;
wherein a one value of the flag indicates that the adaptive loop filtering is enabled for all slices in the picture.

14. A non-transitory computer-readable storage medium storing instructions that cause a processor to:
perform a conversion between a video comprising one or more pictures comprising one or more slices and a bitstream of the video,
wherein the bitstream conforms to a format rule,
wherein the format rule specifies that a flag in a picture header controls applicability of adaptive loop filtering of all slices in the picture,
wherein the format rule further specifies that a constraint on a syntax element included in the bitstream indicating a slice type of a slice of the one or more slices depends on a condition, and
wherein the condition is based on at least one of a general constraint flag, a network abstraction layer unit type, or whether the slice is in a first picture of an access unit.

15. The non-transitory computer-readable storage medium of claim 14,
wherein the condition comprises that a value of the general constraint flag is equal to 1 and indicates an intra-only constraint for the slice, and the constraint on the syntax element is that a value of the syntax element is equal to 2,
wherein the condition comprises that (a) the slice is in the first picture of the access unit and (b) the network abstraction layer unit type has a specific type, wherein the specific type indicates an intra random access point type, and the constraint on the syntax element is that a value of the syntax element is equal to 2, or
wherein the condition comprises that (c) the network abstraction layer unit type is an intra random access point type, and (d) a layer to which the picture containing the slice belongs is an independently decodable layer, and the constraint on the syntax element is that a value of the syntax element is equal to 2.

16. The non-transitory computer-readable storage medium of claim 14, wherein a zero value of the flag indicates that the adaptive loop filtering is disabled for all slices in the picture, and
wherein a one value of the flag indicates that the adaptive loop filtering is enabled for all slices in the picture.

17. A non-transitory computer-readable recording medium storing a bitstream of a video which is generated by a method performed by a video processing apparatus, wherein the method comprises:
generating the bitstream of the video comprising one or more pictures comprising one or more slices, wherein the bitstream conforms to a format rule, wherein the format rule specifies that a flag in a picture header controls applicability of adaptive loop filtering of all slices in the picture, wherein the format rule further specifies that a constraint on a syntax element included in the bitstream indicating a slice type of a slice of the one or more slices depends on a condition, and wherein the condition is based on at least one of a general constraint flag, a network abstraction layer unit type, or whether the slice is in a first picture of an access unit.

18. The non-transitory computer-readable recording medium of claim 17, wherein the condition comprises that a value of the general constraint flag is equal to 1 and indicates an intra-only constraint for the slice, and the constraint on the syntax element is that a value of the syntax element is equal to 2, wherein either 1) the condition comprises that (a) the slice is in the first picture of the access unit and (b) the network abstraction layer unit type has a specific type, wherein the specific type indicates an intra random access point type, and the constraint on the syntax element is that a value of the syntax element is equal to 2, or 2) the condition comprises that (c) the network abstraction layer unit type is an intra random access point type, and (d) a layer to which the picture containing the slice belongs is an independently decodable layer, and the constraint on the syntax element is that a value of the syntax element is equal to 2, wherein a zero value of the flag indicates that the adaptive loop filtering is disabled for all slices in the picture, and wherein a one value of the flag indicates that the adaptive loop filtering is enabled for all slices in the picture.

* * * * *